Dec. 24, 1963 R. F. TSCHANNEN 3,115,547

TRANSISTOR KEYED AUTOMATIC-GAIN-CONTROL APPARATUS

Filed May 2, 1961

United States Patent Office 3,115,547
Patented Dec. 24, 1963

3,115,547

TRANSISTOR KEYED AUTOMATIC-GAIN-CONTROL APPARATUS

Robert F. Tschannen, Lombard, Ill., assignor to Hazeltine Research, Inc., a corporation of Illinois Filed May 2, 1961, Ser. No. 107,191
6 Claims. (Cl. 178—7.3)

Figure 1:
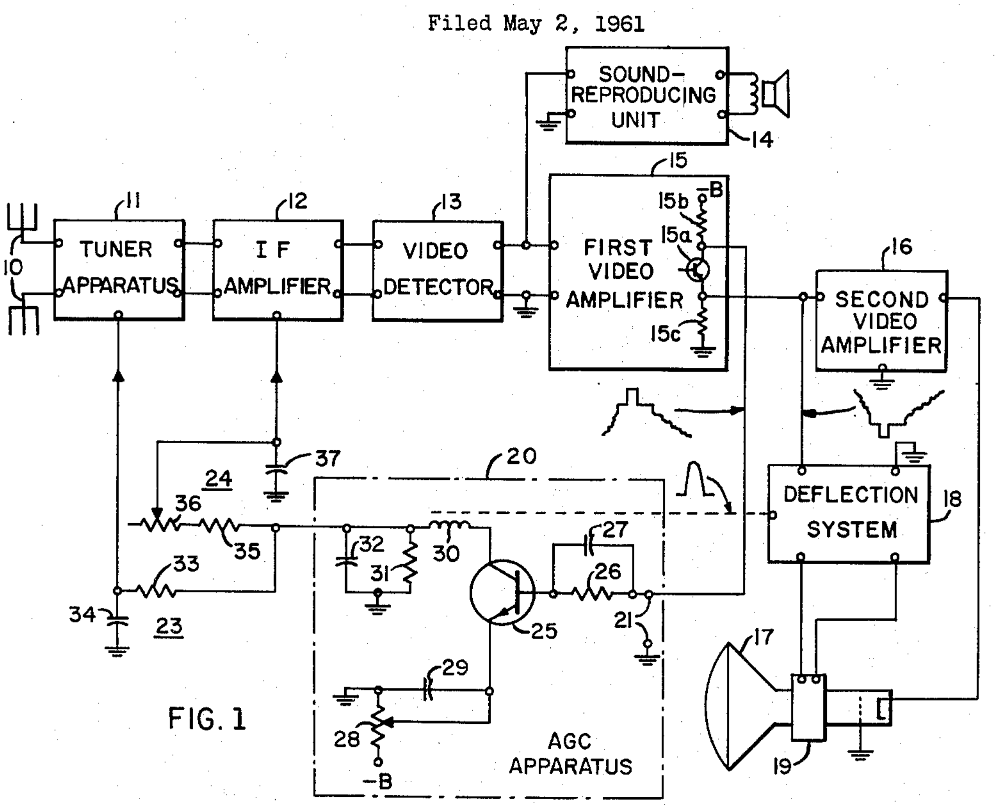

This invention relates to keyed automatic-gain-control apparatus and, more particularly, to such apparatus in which a single transistor is used to derive the automatic-gain-control (AGC) bias.

In a television receiver it is generally considered desirable to use a keyed or gated type of circuit with which to derive the AGC bias that is used in controlling the gain of the initial amplifier stages in the receiver. One reason for this is the superior immunity against impulse noise that the keyed circuit affords over the simpler peak-detecting AGC circuits. Also, it permits the use in the circuit of a relatively short time constant that enables the AGC circuit to compensate for rapid fluctuations in the received signal of the type known as "airplane flutter." However, these keyed circuits have heretofore utilized a vacuum tube, for example a triode, as the keying device which conveniently serves to isolate the load circuit across which the AGC bias is derived from the video supply circuit. The noise immunity is achieved by maintaining the plate of the tube at an average negative potential relative to the cathode to prevent the tube from conducting during the line interval of the composite television signal applied to the grid. The AGC bias is derived during the horizontal synchronizing intervals of the television signal by keying or pulsing the tube into the conductive condition with flyback pulses supplied from the deflection circuit, the amount of conduction being dependent on the peak amplitude of the horizontal synchronizing pulses in the television signal. This periodic instantaneous current flow is integrated in the plate circuit of the vacuum tube and is of proper polarity to produce the desired AGC bias. It will be appreciated that, during the line interval, the plate-cathode terminals of the tube are biased opposite to normal amplifier operation and that, during the horizontal synchronizing interval, this bias arrangement is instantaneously changed to normal amplifier operation.

As previously mentioned, the vacuum tube triode serves to isolate the AGC load circuit from the video supply circuit, a feature that is desirable in view of the fact that the D.-C. voltages in the two circuits are at two different levels. Furthermore, it is immaterial, from the standpoint of this isolating feature, whether the plate-cathode terminals are biased opposite to or in accordance with normal amplifier operation; and, therefore, a vacuum tube serves ideally as a keying device in an AGC circuit.

However, where it is desired to substitute a transistor for the vacuum tube, as in the case of a completely transistorized television receiver, there arises the problem of providing for isolation of the AGC bias circuit from the video supply circuit. It is well known that to maintain isolation between the input and output circuits of a common-emitter transistor amplifier circuit, the collector must be maintained reverse-biased with respect to the base, which is the usual bias arrangement for operating the transistor as an amplifier. If the opposite bias arrangement occurs, then there is a direct short-circuit connection between the input and output circuits through the forward-biased collector-base junction of the transistor. Thus, the use of a transistor as a combined keyer and amplifier has heretofore been considered impracticable.

It is, therefore, an object of the present invention to provide a transistor automatic-gain-control circuit that combines the advantages of keyed operation and amplification in a single transistor.

It is also an object of the present invention to provide a transistor keyed automatic-gain-control circuit which is relatively noise immune and has excellent gain-control properties.

In accordance with the present invention, transistor keyed automatic-gain-control apparatus comprises means for supplying a signal having first components above a predetermined level from which an automatic-gain-control bias may be derived and second components above the level capable of undesirably affecting such bias, and includes means for supplying keying pulses. The apparatus further includes transistor amplifier circuit means coupled to said signal and pulse supplying means, said transistor biased to become conductive only on said signal components above said level for deriving therefrom the automatic-gain-control bias, said transistor having its collector-to-base junction reverse biased over a substantial range of signals supplied to said amplifier circuit means. Included in this amplifier circuit are control means responsive to the abovementioned pulses for controlling the current gain of the amplifier means to limit, to a low level, current conduction caused by the undesired second signal components relative to the current conduction caused by the first signal components, whereby the automatic-gain-control bias is determined substantially only by current conduction caused by the first signal components.

For a better understanding of the present invention, together with other and further objects thereof, reference is had to the following description, taken in connection with the accompanying drawing, and its scope will be pointed out in the appended claims.

Figures 2A, 2B, 2C:
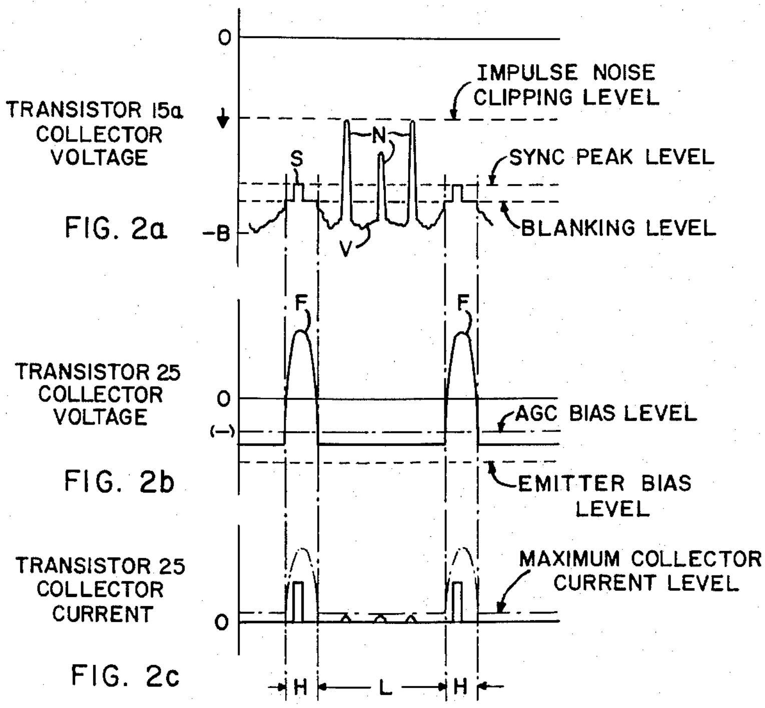

FIG. 1 is a diagram of a television receiver embodying transistor keyed automatic-gain-control apparatus constructed in accordance with the present invention, and FIGS. 2*a*–2*c* are signal diagrams useful in explaining the operation of the AGC apparatus of FIG. 1.

*General Description of Television Receiver*

A description of the basic components of the television receiver shown in FIG. 1 will be considered before taking up in detail the description of the keyed automatic-gain-control apparatus of the present invention. The receiver includes an antenna 10 for intercepting and applying the transmitted television signal to the input of tuner apparatus 11, conventionally constructed to include a radio-frequency amplifier and a frequency converter, the latter to convert the basic frequency of the received and amplified signal to a fixed IF (intermediate-frequency) value. The signal at the output of tuner 11 is then applied to the input of IF amplifier 12, which may include one or more stages of amplification for increasing the amplitude of the signal being translated therethrough to a suitable value for detection in video detector 13. The detected modulation components at the output of detector 13 include the picture and synchronizing signals plus the usual sound carrier on which the audio-frequency sound signal is modulated. The modulated sound carrier is separated out and detected in sound-reproducing unit 14.

The video output circuit of detector 13 is then direct-coupled to first video amplifier 15, partially shown in FIG. 1 as including a PNP transistor **15*a* with collector and emitter load resistors 15*b* and 15*c*, respectively; both preferably being equal in value. The amplified signal at the collector of transistor 15*a* is used to produce the AGC bias in accordance with the present invention, to be described in detail hereinafter. Briefly, however, the composite signal, with synchronizing pulses extending in the positive direction, is supplied to AGC apparatus 20**, wherein the derived AGC bias is determined from the peak amplitude of the synchronizing pulses and applied by low-pass filters 23 and 24 to the amplifiers in units 11 and 12, respectively, to control the gain thereof inversely with variations in strength of the signal received at antenna 10.

The composite signal at the emitter of transistor 15*a* is amplified in second video amplifier 16 and applied to the cathode of picture tube 17. The same signal applied to second video amplifier 16 is also applied to deflection system 18, conventionally constructed to separate the synchronizing components from the picture portion of the composite signal. These synchronizing components are then used to synchronize the derivation therein of horizontal and vertical deflection signals which, when applied to deflection yoke 19, produce the beam raster needed for image reproduction in tube 17.

*Description of Keyed AGC Apparatus 20*

Considering now the transistor keyed AGC apparatus 20 of FIG. 1, such apparatus includes means for supplying a composite television signal, shown in FIG. 2*a* as having a video component V below blanking level and as having horizontal synchronizing pulse components S from which an automatic-gain-control effect may be derived and subject to having impulse noise components N, both extending above blanking level. In the following description and in the claims, the relative terms "above" and "below," when used in this context, are intended only to distinguish between signal components on opposite sides of the blanking level and are not intended to be used in relation to any external reference voltage level. This supply means may comprise the connections from the collector of video transistor 15*a* to the input terminals 21. Also, flyback pulses, conventionally derived during the horizontal blanking interval in the line scan output transformer of deflection system 18, are supplied to apparatus 20 to provide keying operation in accordance with the invention.

There is further provided in the automatic-gain-control apparatus 20 a transistor amplifier circuit including transistor 25, adapted to be responsive to the supplied signal by means of an input circuit including network 26, 27 which couples the signal from input terminals 21 to the base. Current-control means, such as emitter-bias potentiometer 28, is provided to maintain transistor 25 normally nonconductive except on the synchronizing pulse components S and any impulse noise components N which may extend above blanking level. To this end, the emitter bias is set at approximately the same level at which blanking level occurs in the collector of video transistor 15*a*. An output circuit is coupled across the emitter and collector of transistor 25 through bypass capacitor 29 and includes a time-constant network 31, 32, comprising the load circuit across which the AGC bias is derived. In addition, the output circuit includes winding 30, which may consist of several turns on the core of the aforementioned line-scan transformer and which serves as a current-control means in that it causes transistor 25 to have two current-gain conditions: a high gain condition during the occurrence of the flyback pulses in winding 30, and a low gain condition during the interval therebetween corresponding to the interval L of the signal in FIG. 2*a*. Network 31, 32 preferably has a time constant long enough to hold a charge on capacitor 32 over several line scans and short enough to permit the AGC bias to follow, and compensate for, relatively rapid fluctuations in the strength of the received signal, for example, those occurring at field frequency. The value of resistor 31 is chosen in accordance with certain biasing considerations on transistor 25, to be discussed more fully in connection with the operation of apparatus 20. Briefly, however, the value of resistor 31 should be such that the AGC bias developed thereacross for normal ranges of signal strength variations is not sufficient to drive the collector-base junction of transistor 25 into the forward-biased condition.

*Operation of AGC Apparatus 20*

In considering the operation of automatic-gain-control apparatus 20, it will be assumed initially that a television signal, on which a certain amount of impulse noise is superimposed, is being received at antenna 10. After translation through units 11 and 12, detection in unit 13, and amplification in unit 15, the signal appears at the collector of transistor 15*a*, as shown in FIG. 2*a*. Since the base of transistor 15*a* is direct-coupled to detector 13, the peak amplitude of the horizontal synchronizing pulses S is representative of the strength of the intermediate-frequency signal in units 11 and 12. Furthermore, since the collector and emitter load resistors 15*b* and 15*c*, respectively, of transistor 15*a* are equal in value, the peaks of the impulse noise components N are compressed to a level approximately equal to one-half the value of the supply voltage —B. This is because the high amplitudes of the noise impulses drive the video transistor into heavy conduction, at which time the collector and emitter of transistor 15*a* are at the same potential or about half way between ground and —B.

As previously mentioned, the negative potential of the emitter of transistor 25 is biased by means of potentiometer 28 to be approximately equal to the blanking level of the signal in FIG. 2*a*. Thus, transistor 25 is nonconductive for the video components of the signal below blanking level since these components are in such a direction as to drive the base-emitter junction of transistor 25 into reverse bias. The horizontal synchronizing pulses S and impulse noise components N momentarily forward-bias the emitter-base junction, causing transistor 25 to conduct for the duration of the respective pulses. These pulses of current produce a negative voltage at the top of network 31, 32, the value of which, if there were no noise impulses, would be determined by the peak value of the synchronizing pulses and is, therefore, representative of the strength of the signal in units 11, 12, and 13. The impulse noise components, however, may be of sufficient amplitude to take over and determine the value of this derived voltage, thereby destroying its usefulness as an AGC bias. To substantially eliminate the effect of the impulse noise components, the keying pulses in winding 30 are used as the collector voltage on transistor 25 to provide two conditions of signal gain for the amplifier circuit of apparatus 20. As shown in FIG. 2*b*, the collector voltage during the line interval is such that the collector-emitter voltage and, consequently, the collector-base junction bias are very small, thus causing transistor 25 to have a low value of current gain. This results from the fact that, although the impulse noise components at the base drive the transistor into conduction, the transistor almost immediately becomes saturated and the maximum current that can flow during the line interval is thereby limited. However, during the blanking interval the collector-base junction bias is momentarily greatly increased by the flyback pulses F, permitting substantial current conduction on the synchronizing pulse. The effect on the collector current of this dual gain characteristic of apparatus 20 is shown in FIG. 2*c*, where the dot-dash line represents the point at which saturation is reached in transistor 25. This permits the AGC bias across load circuit 31, 32 to be determined substantially only by the current produced by the synchronizing pulses and insures that the AGC bias will not be upset to any substantial degree by the impulse noise components.

Summarizing the keyed operation of transistor 25, the transistor is biased beyond current cutoff for normal ranges of the video signal at the base thereof, and this bias is so arranged to enable the transistor to conduct when the signal extends beyond the blanking level, as during the occurrence of synchronizing pulses. Any noise impulses occurring during the video portion of the input signal drives the transistor into saturation almost immediately, due to the low average base-collector bias, and are thus current-limited in the load circuit 31, 32, producing relatively little change in the voltage developed across the latter circuit. However, because of the increased collector voltage momentarily produced by the flyback pulse, the synchronizing pulse does not drive transistor 25 into a saturated condition, and the resulting relatively heavy surge of collector current flow principally determines the AGC level across load circuit 31, 32.

An interesting feature of AGC apparatus 20, disclosed and claimed in applicant's copending application Serial No. 92,851, filed March 2, 1961, and entitled "Automatic-Gain-Control System," now Patent No. 3,084,216 is that, in the absence of a received signal, the apparatus may be used to derive, across load circuit 31, 32, a residual bias useful as the minimum bias needed for forward gain control of transistor amplifier stages in units 11 and 13. This results from the fact that, in the absence of a translated signal in units 11 and 13, the loop gain is sufficient to cause video transistor 15*a* to be driven into heavy conduction on thermal noise generated within units 11 and 13. Transistor 25 responds to this thermal noise component, during the keying interval, to produce an average voltage across load circuit 31, 32 which is of sufficient magnitude to be used as the desired residual bias. The value of resistor 31 is, therefore, selected to achieve the desired value of residual bias. Since the blanking level of the input signal determines the level at which the emitter bias is set, the expected bias levels across load circuit 31, 32 should be taken into account when designing the input circuit of transistor 25, so that the collector-base junction does not become forward biased on normal ranges of AGC bias variations. In the event the junction should momentarily become forward biased, the value of resistor 26 in the input circuit is preferably made very high to mitigate the short-circuiting effect that would result.

An actually constructed embodiment of the invention has been found to provide very good immunity to impulse noise while simultaneously providing highly sensitive AGC action over a relatively wide range of input signal strengths. While applicant does not wish to be limited to any particular set of circuit constants, the following have proved useful in the automatic-gain-control system of FIG. 1:

| | |
|---|---|
| Resistors **15***b* and **15***c* | 1 kilohm, each. |
| Resistor **26** | 33 kilohms. |
| Potentiometer **28** | 10 kilohms, max. |
| Resistor **31** | 1.8 kilohms. |
| Resistor **33** | 10 kilohms. |
| Resistor **35** | 1 kilohm. |
| Potentiometer **36** | 25 kilohms, max. |
| Capacitor **27** | 0.01 microfarad. |
| Capacitor **29** | 4 microfarads. |
| Capacitor **32** | 0.1 microfarad. |
| Capacitors **34** and **37** | 4 microfarads, each. |
| Winding **30** | 4 turns around horizontal output transformer core. |
| Transistor **15***a* | TI R325. |
| Transistor **25** | 2N1306. |

While there has been described what, at present, is considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Transistor keyed automatic-gain-control apparatus comprising: means for supplying a signal having first components above a predetermined level from which an automatic-gain-control bias may be derived and second components above said level capable of undesirably affecting said bias; means for supplying keying pulses; and transistor amplifier circuit means coupled to said signal and pulse supplying means, said transistor biased to become conductive only on said signal components above said level for deriving therefrom said automatic-gain-control bias said transistor having its collector-to-base junction reverse biased over a substantial range of signals supplied to said amplifier circuit means, said circuit means including control means responsive to said pulses for controlling the current gain of said amplifier means to limit, to a low level, current conduction caused by said undesired second signal components relative to the current conduction caused by said first signal components; whereby said automatic-gain-control bias is determined substantially only by current conduction caused by said first signal components.

2. Transistor keyed automatic-gain-control apparatus comprising: means for supplying a signal having components above and below a predetermined level, the components above said level including first components from which an automatic-gain-control bias may be derived and second components capable of undesirably affecting said bias; means for supplying keying pulses; and transistor amplifier circuit means responsive to said signal for deriving therefrom said automatic-gain-control bias said transistor having its collector-to-base junction reverse biased over a substantial range of signals supplied to said amplifier circuits means, and including first current-control means for maintaining said circuit nonconductive on said signal components below said predetermined level and conductive on said components above said level, and second current-control means responsive to said pulses for controlling the current gain of said amplifier means to limit, to a low level, current conduction caused by said undesired second signal components relative to the current conduction caused by said first signal components; whereby said automatic-gain-control bias is determined substantially by current conduction caused by said first signal components.

3. Transistor keyed automatic-gain-control apparatus for a television receiver comprising: means for supplying a composite television signal having video components below blanking level, synchronizing pulse components above said level from which an automatic-gain control bias may be derived, and subject to having impulse noise components capable of undesirably affecting said bias; means for supplying keying pulses; and coupled to said signal and pulse supplying means, said transistor biased transistor amplifier circuit means to become conductive only on said signal components above said level for deriving therefrom said automatic-gain-control bias said transistor having its collector-to-base junction reverse biased over a substantial range of signals supplied to said amplifier circuit means, said circuit means including control means responsive to said keying pulses for controlling the current gain of said amplifier means to limit, to a low level, any current conduction caused by said impulse noise components relative to the current conduction caused by said synchronizing pulse components; whereby said automatic-gain-control bias is determined substantially only by current conduction caused by said synchronizing pulse components.

4. Transistor keyed automatic-gain-control apparatus for a television receiver comprising: means for supplying a composite television signal having video components below blanking level, synchronizing pulse components above said level from which an automatic-gain-control bias may be derived, and subject to having impulse noise components which may extend above blanking level and be of sufficient magnitude to undesirably affect said bias; means for supplying keying pulses; and transistor amplifier circuit means responsive to said signal for deriving therefrom said automatic-gain-control bias said transistor having its collector-to-base junction reverse biased over a substantial range of signals supplied to said amplifier circuit means, and including first current-control means for maintaining said circuit nonconductive on said video signal components and conductive on said components above said level and second current-control means responsive to said keying pulses for controlling the current gain of said amplifier means to limit, to a low level, any current conduction caused by said impulse noise components relative to any current conduction caused by said synchronizing pulse components; whereby said automatic-gain-control bias is substantially determined only by current conduction caused by said synchronizing pulse components.

5. Transistor keyed automatic-gain-control apparatus comprising: means for supplying a signal having components above and below a predetermined level, the components above said level including first components from which an automatic-gain-control bias may be derived and second components capable of undesirably affecting said bias; means for supplying keying pulses; and transistor amplifier circuit means coupled to said signal and pulse supplying means, said transistor biased to become conductive only on said signal components above said level for deriving therefrom said automatic-gain-control bias said transistor having its collector-to-base junction reverse biased over a substantial range of signals supplied to said amplifier circuit means, said circuit means including current-control means responsive to said pulses for imparting a high signal gain to said circuit means during the occurrence of said first signal components and a substantially lower signal gain during the periods intermediate the occurrences of said first signal components to substantially suppress current conduction caused by said second substantially only by current conduction caused by said signal components during said intermediate periods; whereby said automatic-gain-control bias is determined first signal components.

6. Transistor keyed automatic-gain-control apparatus comprising: means for supplying a composite television signal having video components below the blanking level, synchronizing pulse components above said level from which an automatic-gain-control bias may be derived, and subject to having impulse noise components above said level capable of undesirably affecting said bias; means for supplying keying pulses synchronous with the occurrence of said synchronizing pulse components; a transistor having input electrodes coupled to said signal-supply means said transistor having its collector-to-base junction reverse biased over a substantial range of signals applied by said signal-supplying means; means for maintaining said transistor nonconductive except during occurrence of said signal components above blanking level; means coupled to output electrodes of said transistor and responsive to said keying pulses for permitting substantial current gain only during the occurrence of said pulses; and output circuit means responsive to current conduction in said transistor for deriving therefrom said automatic-gain-control bias said transistor having its collector-to-base junction reverse biased over a substantial range of signals supplied to said amplifier circuit means; whereby said bias is determined substantially only by current conduction caused by said synchronizing pulse component.

References Cited in the file of this patent

UNITED STATES PATENTS 2,906,817 Kidd ---------------- Sept. 29, 1959